F. W. Devoe,
Making Metal Cans.
Nº 42,355.                    Patented Apr. 19, 1864.
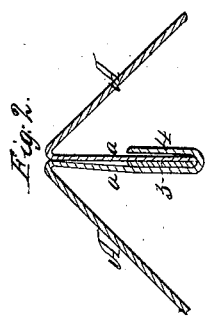
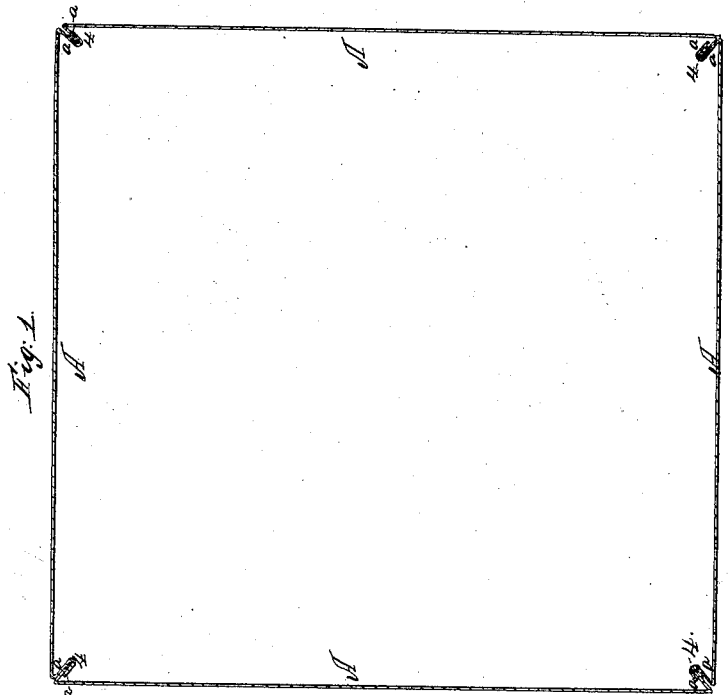
Witnesses:
Jas R Hall
Geo W Reed
Inventor:
Fred. W. Devoe

UNITED STATES PATENT OFFICE.

FREDERICK W. DEVOE, OF NEW YORK, N. Y.

IMPROVEMENT IN THE MANUFACTURE OF TIN CANS.

Specification forming part of Letters Patent No. 42,355, dated April 19, 1864.

*To all whom it may concern:*

Be it known that I, FREDERICK W. DEVOE, of the city, county, and State of New York, have invented a new and useful Improvement in Soldered Joints for Cans and other Vessels of Sheet Metal; and I do hereby declare that the following is a full, clear, and exact description of the same, reference being had to the accompanying drawings, forming part of this specification, in which—

Figure 1 is a horizontal section of a tin can constructed according to my invention. Fig. 2 is a similar section of one of the joints of the can on a larger scale.

Similar letters of reference indicate corresponding parts in both figures.

This invention relates to the rib-joint which forms the subject-matter of Letters Patent No. 40,661, granted to Charles Y. Raynolds, myself, and Charles Pratt, as assignees of Herman Miller. That joint is well adapted for uniting the sides of square vessels, as it gives great stiffness at the corners; but as it depends entirely on the cohesiveness of the solder for its capability of resisting any force which tends to tear it apart, it is not as strong in this respect as might be desired.

The object of my invention is to remedy this defect; and to this end it consists in forming a lap at the edge of the rib by folding the margin of one plate or portion of the joint over that of the other plate or portion, the said lap serving to give increased strength to the joint, and also to increase the stiffness of the rib.

A A represent the plates forming the sides of the can, and $a$ $a$ the marginal portions, which are turned in at proper angles to the plates to form the rib-joints. One of the said marginal portions has its edge turned in again, as shown at 3 in Fig. 2, and pressed as flat as possible, and the other has its edge folded or lapped over the turned-in edge of the first one, as shown at 4, and the two are pressed together as closely as possible preparatory to soldering. This joint is soldered in the same way as the patented rib-joint hereinbefore mentioned by placing the turned-in marginal portions in a vise or clamp of suitable form, to clamp them closely together with the outer angle of the seam upward, and applying the solder, followed by the hot soldering-iron all along the said angle. The solder will run between the two opposite faces of $a$ $a$, and some of it may run into the lap 4; but the said lap greatly strengthens the joint whether the solder runs into it or not, as it serves not only to aid the solder in holding the two parts of the joint together, but adds to the stiffness of the rib. The inner lap, 3, is not an indispensable feature of my invention. It gives greater stiffness to the rib, though it does not aid the solder in holding the two parts of the joint together.

What I claim as my invention, and desire to secure by Letters Patent, is—

The lap 4, in combination with the inwardly-projecting rib-joint $a$ $a$, substantially as and for the purpose herein described.

FRED. W. DEVOE.

Witnesses:
   MONTGOMERY M. LIVINGSTON,
   G. WASHINGTON REED.